UNITED STATES PATENT OFFICE.

JAMES RIDDICK PARTINGTON, OF LOSTOCK GRALAM, AND GEORGE JOSEPH JONES, OF LONDON, ENGLAND.

MANUFACTURE OF AMMONIUM NITRATE.

1,306,924.      Specification of Letters Patent.     Patented June 17, 1919.

No Drawing.     Application filed December 10, 1918. Serial No. 266,136.

*To all whom it may concern:*

Be it known that we, JAMES RIDDICK PARTINGTON, of School Lane, Lostock Gralam, in the county of Chester, England, and GEORGE JOSEPH JONES, of University College, Gower Place, London, W. C. 1, England, have invented certain new and useful Improvements in the Manufacture of Ammonium Nitrate, of which the following is a specification.

This invention relates to the manufacture of ammonium nitrate.

As is well known, ammonium nitrate may be produced as a fume or mist by various processes such, for example, as by the interaction of nitric acid and ammonia gas; such fume or mist, however, is extremely difficult to condense and is often incapable of being utilized with the result that a considerable loss often ensues in such processes.

Our experiments have led us to believe that the above difficulty is due to the moist condition of the fume or mist and our invention consists in passing the ammonium nitrate fume or mist, howsoever it may be obtained, through a dehydrating agent whereby it is more or less dried, whereupon it will be found that the ammonium nitrate may be readily condensed and collected for use.

In carrying our invention into effect, we form the ammonium nitrate fume or mist in any suitable manner as, for example, by the interaction of nitric acid and ammonia gas, and the fume or mist so produced we cause to pass over or through a dehydrating agent such, for example, as strong sulfuric acid, whereupon it will be found that the fume or mist so dried may be readily condensed and will settle in or upon the surface or surfaces with which it is in contact and can thus be readily recovered and collected for use.

If ammonium nitrate and sulfuric acid be allowed to react on one another in solution ammonium sulfate and nitric acid are produced, but we have found in practice that when the fume or mist of ammonium nitrate is passed through strong sulfuric acid very little, if any, is retained by the acid and the great bulk of the ammonium nitrate passes through dried but otherwise unaltered.

It will be understood that we do not confine our invention to any particular process for the production of the ammonium nitrate fume or mist nor to any particular means employed for drying the same as we may use any other suitable dehydrating agent, means, or medium, which will have the effect of drying or partially drying the fume or mist without otherwise altering its composition.

Having now described our invention what we claim as new and desire to secure by Letters Patent is:—

1. The process of producing ammonium nitrate which comprises producing a suspension of finely divided ammonium nitrate in a gas, causing said suspension to contact with a dehydrating agent and separating the ammonium nitrate from the gas.

2. The process of producing ammonium nitrate which comprises producing a fume of ammonium nitrate, causing the fume to contact with a dehydrating agent and effecting the precepitation of the ammonium nitrate from the treated fume.

3. The process of producing ammonium nitrate comprising treating a suspension of finely divided ammonium nitrate in a gas in order to reduce the amount of water contained in such suspension and effecting the precipitation of the ammonium nitrate from such suspension.

4. The process of producing ammonium nitrate which comprises treating a suspension of ammonium nitrate with a dehydrating agent in order to reduce the amount of water contained in such suspension and effecting the precipitation of the ammonium nitrate from such suspension.

5. The process of producing ammonium nitrate which comprises treating a suspension of ammonium nitrate with strong sulfuric acid in order to reduce the amount of water contained in such suspension and effecting the precipitation of the ammonium nitrate from such suspension.

In testimony whereof we have signed our names to this specification.

JAMES RIDDICK PARTINGTON.
GEORGE JOSEPH JONES.